United States Patent Office 3,329,695
Patented July 4, 1967

3,329,695
SILYLORGANOCYCLOPENTADIENYLMETAL-
CARBONYLS AND PROCESS THEREFOR
Edward V. Wilkus, Albany, and Abe Berger, Schenectady,
N.Y., assignors to General Electric Company, a corporation of New York
No Drawing. Filed May 27, 1963, Ser. No. 283,526
10 Claims. (Cl. 260—429)

The present invention relates to a variety of novel silylorganocyclopentadienylmetalcarbonyls and methods for making such materials.

The novel silylorganocyclopentadienylmetalcarbonyls of the present invention, referred to hereinafter as silylorganometalcarbonyls have at least one silylorgano radical of the formula, (1) 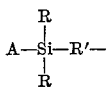

bonded chemically to a nucleus composed of a metal carbonyl complex of the formula, (2) $M(CO)_x$ chemically combined with a five-membered carbocyclic whose free valences, other than those satisfied with said silylorgano radical, are satisfied with monovalent radicals selected from hydrogen radicals, electron donating organic radicals, electron withdrawing organic radicals, and mixtures thereof, where M is a metal selected from the class of vanadium, chromium, molybdenum, tungsten, and manganese, $x$ is equal to the number of sites available on M for chemically combining with CO molecules, R is a member selected from hydrogen, halogen radicals, alkoxy radicals, monovalent hydrocarbon radicals, halogenated monovalent hydrocarbon radicals, cyanoalkyl radicals and fluoroalkyl radicals, A is a member selected from a hydroxy radical and an R radical, and R' radical, and R' is a member selected from a divalent hydrocarbon radical and —R"—Y—, where R" is a divalent hydrocarbon radical of at least two carbon atoms, and Y is a carbofunctional radical selected from carbonyl, carbinol, carbamino, and carbazido.

Radicals included by R of Formula 1 are aryl radicals, and halogenated aryl radicals such as phenyl, chlorophenyl, xylyl, tolyl, etc.; aralkyl radicals such as phenylethyl, benzyl, etc.; aliphatic, haloaliphatic, and cycloaliphatic, such as alkyl, alkenyl, cycloalkyl, haloalkyl, including methyl, ethyl, propyl, butyl, cyclohexyl, etc., halogen radicals such as chloro, bromo, etc.; alkoxy radicals such as methoxy, ethoxy, propoxy, heptoxy, etc.; cyanoalkyl radicals such as cyanoethyl, cyanopropyl, cyanobutyl, etc.; and fluoroalkyl radicals such as fluoroethyl, fluoropropyl, fluorobutyl, etc. Radicals included by R' of Formula 1 are arylene radicals and alkylene radicals, such as phenylene, tolylene, methylene, ethylene, trimethylene, tetramethylene, pentamethylene, decamethylene, etc. Radicals included by R" of Formula 1 are arylene radicals included by R' and alkylene such as ethylene, trimethylene, etc. Radicals included by A are all of the aforementioned R radicals, and a hydroxy radical. Except when A is hydroxy, R and A can be all the same radical or mixtures of the aforementioned R radicals.

Unless otherwise designated, the term "metalcarbonyl" as employed hereinafter will designate an organometallic compound of a metal carbonyl complex as shown by Formula 2, chemically combined with a five-membered carbocycle such as cyclopentadiene which is substituted with monovalent electron donating radicals, monovalent electron withdrawing radicals and mixtures thereof.

Some of the silylorganometalcarbonyls of the present invention can be made by acylating at a temperature between −25° C. to 100° C., a metalcarbonyl having the formula, (3) $[C_5(H)_a(Q)_b(Q')_c]M(CO)_x$ with a silylorganocarboxylic acid halide having the formula, (4) 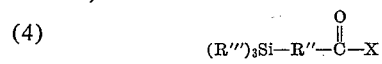

where R", M, and $x$ are as defined above, R''' is a member selected from hydrogen, halogen radicals, monovalent hydrocarbon radicals, halogenated monovalent hydrocarbon radicals, cyanoalkyl and fluoroalkyl radicals, included by R above, X is a halogen radical, $a$ is an integer equal to from 1 to 5, inclusive $b$ is a whole number equal to from 0 to 4, inclusive, $c$ is a whole number equal to from 0 to 1, inclusive, and the sum of $a$, $b$ and $c$ is equal to 5, Q is a monovalent electron donating organic radical selected from aromatic radicals, aliphatic radicals, carboxyaliphatic radicals, triorganosilyl radicals, amino radicals, nitroaliphatic radicals, and a silylorgano radical as shown in Formula 1, where R' is a divalent hydrocarbon radical, and Q' is a monovalent electron withdrawing organic radical selected from aliphaticacyl radicals, arylacyl radicals, carboxy radicals, aldehydic radicals, carboxyaryl radicals, sulfo radicals, nitroaryl radicals, haloaryl radicals, haloaliphatic radicals, and a silylorgano radical of Formula 1 where R' is an —R"—Y— radical, and Y is carbonyl.

A method for preparing some of the silylorganocarboxylic acid halides of Formula 4 is shown by Sommer et al., J. Am. Chem. Soc., 73, 5130 (1951), which involves the alkylation of a malonic ester with a haloalkyltrialkylsilane, followed by halogenating the resulting acid. Another method is shown by Petrov et al., D. Akad. Nauk, SSSR 100, 711 (1955), who utilize beta-cyanoalkyltrihalosilane which is initially alkylated, and then hydrolyzed.

Included in the present invention, are silylorganometalcarbonyls having the formula, (5) $((R''')_3Si-R''-Y)_n-[C_5(H)_d(Q)_b(Q')_c]M(CO)_x$ where R", R''', Q, Q', M, $x$, $b$, $c$ and Y are as defined above, $n$ is an integer equal to from 1 to 5, inclusive, $d$ is an integer equal to from 0 to 4, inclusive, and the sum of $d$, $b$ and $c$ is equal to from 0 to 4, inclusive. These silylorganometalcarbonyls can be made either directly, or derived from the product of reaction of the metalcarbonyl of Formula 3 and a silylorganocarboxylic acid halide of Formula 4. The carbonyl group of the acylated metalcarbonyl of Formula 4 can be modified in accordance with standard chemical procedures to produce a variety of other silylorganometalcarbonyls. For example, the carbonyl group included by Y of Formula 5, can be reduced to a methylene group or partially reduced to a carbinol group by standard chemical methods. Other chemical transformations can also be effected with the silylorganometalcarbonyls of Formula 5 in accordance with procedures known to those skilled in the art.

Monovalent electron donating organic radicals included by Q, shown by Formulae 3 and 5 above are for example, aromatic radicals such as aryl radicals, for example, phenyl, tolyl, naphthyl, etc.; hydroxyaryl, such as hydroxyphenyl; aliphatic radicals including alkyl radicals such as methyl, ethyl, propyl, butyl, octyl, etc.; alkenyl radicals such as vinyl, propenyl, etc.; cycloaliphatic such as cyclohexyl, cycloheptyl, etc.; carboxyalkyl radicals, such as carboxymethyl, carboxyethyl, etc.; triorganosilyl radicals such as trimethylsilyl, dimethylphenylsilyl, etc., nitroaliphatic radicals such as nitromethyl, nitroethyl, etc. Monovalent electron withdrawing radicals included by Q' are for example, aliphatic acyl, such as formyl, acetyl, propionyl; arylacyl such as benzoyl, etc.; carboxy, aldehydic, sulfo, carboxyaryl such as carboxyphenyl, carboxytolyl, etc.; nitroaryl such as nitrophenyl, haloaryl such as chlorophenyl, bromotolyl, etc.; and haloaliphatic such as chloromethyl, chloroethyl, etc.

In instances where a silylorganometalcarbonyl is desired, where R' of Formula 1 is a divalent hydrocarbon radical of less than 3 carbon atoms in length, a method other than acylation of a metalcarbonyl with a silyl acid halide of Formula 4 is employed. For example, one procedure that can be employed to make a silylorganometalcarbonyl in which R' of Formula 1 is a divalent carbon atom is by acetylating a metalcarbonyl as previously defined. The acetyl radical on the metalcarbonyl nucleus can be converted to the corresponding carboxylate in accordance with hypohalite oxidation known to those skilled in the art. The resulting carboxylated metalcarbonyl can be treated with lithium aluminum hydride to reduce the carboxylate radical to the corresponding carbinol. The methoxy analogue of the carbinol can be made in accordance with standard base condensation procedures which in turn can be lithiated with butyllithium to form the corresponding metalcarbonyl methylene lithiate. Treating the metalcarbonyl methylene lithiate with a halo silane which can be substituted with R radicals as shown in Formula 1, will produce the desired silylmethylenemetalcarbonyl. Another procedure that can be employed to form the silylmethylenemetalcarbonyl is to treat a metalcarbonyl as defined above with a mixture of an aldehyde and a secondary amine or a reaction product thereof in the presence of a condensing agent such as phosphoric acid, phosphorous trichlorosilane, etc., as shown by C. Hauer, O.S. 40, 31 (1960). The product is converted to a quaternary amine with an alkyl halide. The resulting quaternary amine salt is treated with a substituted silyl metallic, by the procedure of Nesmeyanof et al. Izv. AN SSSR, Otd. Khim. 11, 1982 (1961), to form the corresponding silylmethylenemetalcarbonyl.

A silylorganometalcarbonyl of the present invention also can be made having a silylorgano radical of Formula 1 bonded to a metallocene in which the silicon atom is separated from the nucleus by two carbon atoms. A metalcarbonyl substituted with a formaldehydic radical can be treated with the Grignard of halomethyltrimethylsilane.

Some of the silylorganometalcarbonyls included by the present invention are for example, trimethylsilylpropionylcyclopentadienylmanganesetricarbonyl,
dimethylphenylsilylpropionylcyclopentadienylmanganesetricarbonyl,
dimethylhydroxysilylpropionylcyclopentadienylmanganesetricarbonyl,
trichlorosilylpropionylcyclopentadienylmanganesetricarbonyl,
dimethylsilylpropionylcyclopentadienylmanganesetricarbonyl,
trimethylsilylbenzoylcyclopentadienylmanganesetricarbonyl,
2-hydroxy, 4-trimethylsilylbenzoylcyclopentadienylmanganesetricarbonyl,
trimethylsilylphenylmethylenecyclopentadienylmanganesetricarbonyl,
trimethylsilyltetramethylenecyclopentadienylmanganesetricarbonyl,
methyldiphenylsilyltrimethylenecarbinolcyclopentadienylmanganesetricarbonyl, etc.,
trimethylsilylphenylmethylenecyclopentadienylvanadiumtetracarbonyl,
trimethylsilyltetramethylenecyclopentadienylchromiumtricarbonyl dimer,
methyldiphenylsilyltrimethylenecarbonylcyclopentadienylmolybdenumtricarbonyl dimer,
trimethylsilylphenylmethylenecyclopentadienyltungstentricarbonyl dimer, etc.

Other silylorganometalcarbonyls that are included in the present invention are 1,2-bis(trimethylsilylpropionyl)cyclopentadienylmanganesetricarbonyl,
1,2-trimethylsilylpropionyltrimethylsilyltrimethylenecyclopentadienylvanadiumtetracarbonyl,
1,2-trimethylsilylpropionyl, methylcyclopentadienyltungstentricarbonyl dimer,
1,2-trimethylsilylpropionyl, phenylcyclopenadienylchromiumtricarbonyl dimer,
1,2-trimethylsilylpropionyl, sulfocyclopentadienylmanganesetricarbonyl,
1,2-trimethylsilylpropionyl, chlorophenylcyclopentadienylmolybdenumtricarbonyl dimer,
1,2-dimethylphenylsilylpropionyltrimethylsilylcyclopentadienylmanganesetricarbonyl,
1,2-bis(dimethylhydroxysilyltrimethylene)cyclopentadienylmanganesetricarbonyl,
1,2-bis(dimethylchlorosilyltrimethylene)cyclopentadienylmanganesetricarbonyl,
trimethylsilylphenylmethylene,
trimethylsilyltrimethylenecyclopentadienylmanganesetricarbonyl, etc.

The silylorganocyclopentadienylmetalcarbonyls of the present invention can be employed as U.V. absorbers, antiknock compounds, antioxidants, heat-stabilizers for organopolysiloxane elastomers, etc.

The silylorganometalcarbonyls of the present invention can also be converted to metalcarbonylorganodisiloxanes having the formula, (6) 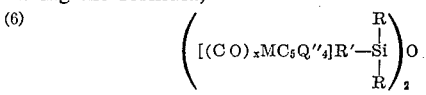

in accordance with standard chemical procedures, where R', M, and R are as defined above, and Q'' is a member selected from hydrogen, an electron donating radical and an electron withdrawing radical. For example, if A in Formula 1 is a hydrolyzable radical such as a halogen radical, or a sulfato radical formed by cleavage, such as demethylating a monovalent hydrocarbon radical from silicon with a strong sulfuric acid solution, the metalcarbonylorganodisiloxane of Formula 6 can be made by direct hydrolysis of the corresponding silylorganometalcarbonyl.

The silylorganometalcarbonyls of the present invention can also be utilized to form metalcarbonylsiloxane polymers and copolyers of metalcarbonylsiloxy units and organosiloxy units. These polymers and copolymers have the characteristic unit, (7) 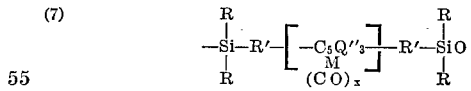

where R, R', Q'', M and x are as defined above. For example, a cyclopentadienyl metal carbonyl radical of the present invention having two silylorgano radicals of Formula 1 chemically bonded to the cyclopentadiene ring in which the terminal A group is a hydrolyzable radical such as halogen, or a radical resulting from cleavage of, for example, a monovalent hydrocarbon radical, can be directly hydrolyzed to metalcarbonylsiloxane polymers. This procedure is more particularly described in copending application Ser. No. 283,530, filed May 27, 1963, and assigned to the same assignee as the present invention, relating to silylorganometalcarbonyls, such as silylorganoferrocenes and assigned to the same assignee as the present invention. Cohydrolysis of such hydrolyzable silylorganometallocene radicals with organosiloxy units of Formula 8 below, result in the production of copolymers, (8) 

where $e$ is a whole number equal to from 0 to 3, inclusive, and Z is a monovalent hydrocarbon radical, a halogenated monovalent hydrocarbon radical, a cyanoalkyl radical and a fluoroalkyl radical, included by R of Formula 1 above.

Also included in the scope of the present invention, are polymers composed of chemically combined units of the formula, (9)

where Z is as defined above, $f$ is a whole number equal to from 0 to 2, inclusive, and Z' is a radical of the formula,

(10) 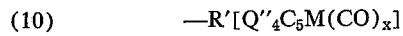

where R', Q", M and $x$ are as defined above. Copolymers composed of chemically combined units of Formula 9 and organosiloxane units shown by Formula 8 are also included within the scope of the present invention. These copolymers can be made by the method shown in copending application Ser. No. 283,544, filed May 27, 1963, and assigned to the same assignee as the present invention.

The polymers having units shown in Formula 7, copolymers composed of chemically combined units of Formulae 7 and 8, polymers of Formula 9, and copolymers of chemically combined units of (8) and (9) can be employed in a variety of applications including U.V. absorbers, heat stabilizers for organopolysiloxane compositions, and other applications described in more detail in the aforesaid copending applications.

In accordance with the practice of the invention, a metalcarbonyl is acylated with a silylorganocarboxylic acid halide referred to hereinafter as "silyl acid halide." The resulting silylorganometallocene can be converted to various silylorganometalcarbonyl derivatives by standard chemical procedures including further acylation in accordance with the practice of the invention, if feasible.

In most instances, the acylation of the metalcarbonyl can be accomplished by standard Friedel-Crafts methods. Experience has shown however, that a modified Friedel-Crafts procedure is employed when utilizing a silyl acid halide having no more than two carbon atoms between the silicon atom and the carbonyl group. It has been found for example, that unlike many silyl acid halides, silylpropionyl halide decomposes when mixed directly with a Friedel-Crafts catalyst, such as aluminum halide in the absence of the metalcarbonyl. Instead of forming a stable complex with the aluminum halide, unexpectedly silyl acid halides having no more than two carbon atoms between the silicon atom and carbinol group decompose to carbon monoxide, the corresponding halo silane and olefin, if the complex is formed in the absence of the metalcarbonyl as previously described. Generally, any standard Friedel-Crafts acylation procedure can be utilized for acylating the metalcarbonyl. In instances where a silyl acid halide such as propionyl halide is used however, it is preferred to add the Friedel-Crafts catalyst in small increments to a mixture of the metalcarbonyl and the silyl acid halide.

If desired, a suitable organic solvent can be utilized during the acylation of the metalcarbonyl to facilitate the acylation reaction. Suitable organic solvents are any organic solvents that are substantially inert to the reactants or to the conditions of the reaction and which facilitate the acylation of the metallocene. Suitable organic solvents include for example, methylene chloride, benzene, toluene, xylene, carbon disulfide nitrobenzene, etc. Temperatures at which the acylation of the metalcarbonyl can be effected can vary widely. For example, a range of from −25° C. to 100° C. has been found operable, while a range of between 0° C. to 50° C. is preferred. Any standard Friedel-Crafts catalyst can be utilized to effect the acylation of the metalcarbonyl with the silyl acid halide. A preferred Friedel-Crafts catalyst is aluminum chloride. Other Friedel-Crafts catalysts that can be employed however, are for example, $BF_3$, $ZnCl_2$, $SnCl_4$, etc.

Except in instances where acylation of the metalcarbonyl is accomplished with a silyl acid halide, such as a silylpropionyl halide as discussed above, the acylation of the metalcarbonyl can be carried out by any one of several well known Friedel-Crafts procedures. One method, for example, involves forming a complex of the silyl acid halide of the Friedel-Crafts catalyst and then reacting the complex with the metallocene. Variations of this procedure can also be done without adversely affecting the yield of the final product. For example, the silyl acid halide can be added to a mixture of the aluminum halide and the metallocene.

When the acylation of the metalcarbonyl is completed, as shown by no further evolution of hydrogen halide produced during the reaction, hydrolysis of the acylated metalcarbonyl can be readily accomplished. An acidified mixture of water and ice can be employed. The final product can be extracted by use of a suitable organic solvent, and then recovered in accordance with standard procedures such as chromatography, etc.

If desired, the acylated metalcarbonyl can be modified further by converting the carbonyl group in accordance with standard chemical procedures to another carbofunctional group. Further reaction of the substituted metalcarbonyl nucleus can also be achieved such as, alkylation, sulfonation, and other standard reactions analogous to chemical reactions common to organic aromatic chemistry. In addition, the monovalent functional groups on the silicon atom of the silylorgano radical can also be replaced with other monovalent radicals to provide for additional chemical reactions with the acylated metallocene. For example, a silicon-carbon cleavage reaction can be utilized to form silanol radicals; silicon halogen bonds can be alkoxylated to form alkoxy silanes, etc.

In order that those skilled in the art will be better able to practice the present invention, the following examples are given by way of illustration and not by way of limitation. All parts are by weight.

*Example 1*

Cyclopentadienylmanganesetricarbonyl was acylated with gamma-trimethylsilylbutyryl chloride by the following method.

There was added with stirring to a mixture of 10.2 parts of cyclopentadienylmanganesetricarbonyl, and 9 parts of gamma-trimethylsilylbutyryl chloride in 130 parts of dry methylene chloride, 8.7 parts of aluminum chloride. The aluminum chloride was added gradually in small increments over a period of about 1 hour, while the reaction mixture was maintained under an atmosphere of nitrogen. The acylation was allowed to continue for an additional hour at a temperature of about 25° C. during which time the mixture was stirred. The resulting Friedel-Crafts complex, which was red in color, was then hydrolyzed in an aqueous HCl mixture and worked up in a conventional manner. The crude product was taken up in n-hexane and fractionated by chromatography using a column prepared with neutral alumina and n-hexane. The product was a yellow oil. Its infrared spectrum showed the characteristic spectrum for a ketone. Based on method of preparation and infrared spectrum the product was gamma-trimethylsilylbutyrylcyclopentadienylmanganesetricarbonyl having the formula,

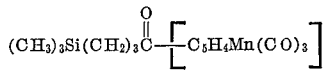

*Example 2*

There is added 26.5 parts of cyclopentadienylmanganesetricarbonyl to a well stirred solution of 21.6 parts of bis(dimethylamino)methane and 21.6 parts of phosphoric acid in 200 parts of acetic acid. The resulting mixture is heated on a steam bath for 5 hours and then diluted with 250 parts of ice water. The solution is made alkaline by adding 125 parts of sodium hydroxide pellets to effect the separation of the crude dimethylaminomethylcyclopentadienylmanganesetricarbonyl.

There is added with stirring, 62 parts of methyl iodide to a solution of the above product, in 17 parts of methanol. The mixture is heated on a steam bath for an additional 5 minutes, and then cooled to room temperature. There is added to the mixture, 280 parts of ethyl ether which results in the separation of the quaternary salt of dimethylaminomethylcyclopentadienylmanganesetricarbonyl. The solid is collected and dried.

Cyclopentadienylmanganesetricarbonylmethylenedimethylphenylsilane is formed in accordance with the method of Nesmeyanof et al., cited above, from the above quaternary salt, by treating it with dimethylphenylsilyl lithium, which is obtained from the corresponding sym. tetramethyldiphenyldisilane.

A solution in tetrahydrofuran is prepared having a ratio of three moles of phenyldimethylsilyl lithium per mole of the quaternary salt of N,N-dimethylaminomethylcyclopentadienylmanganesetricarbonyl. The solution is refluxed in an atmosphere of nitrogen for 15 hours. Hydrochloric acid is added cautiously, and the organic layer is recovered. The solvent is stripped and the resulting residue is fractionated by chromatography, utilizing a column prepared with neutral 80 mesh alumina and n-hexane. A yellow oil is recovered. Its infrared spectrum shows silicon-phenyl and silicon-methyl bonds superimposed on the spectrum of cyclopentadienylmanganesetricarbonyl. Based on its method of preparation and infrared spectrum the product has the formula,

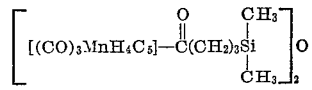

Example 3

An equal molar amount of trimethylsilylmethylmagnesium bromide dissolved in tetrahydrofuran is added with stirring to a solution of acetylcyclopentadienylmanganesetricarbonyl also in tetrahydrofuran. The addition is performed while the mixture is refluxing under a nitrogen atmosphere. Following the addition, the mixture is allowed to reflux for an additional 24 hours. The reaction product is decomposed with an ice-cold saturated solution of ammonium chloride in water. The resulting produce is then recovered and fractionated in accordance with the procedure of Example 1. Infrared spectrum shows the presence of carbonyl and a silicon-methyl bond superimposed on the spectrum of cyclopentadienylmanganesetricarbonyl. Based on the method of preparation and its infrared spectrum, the product has the formula,

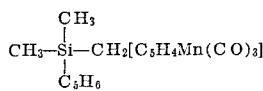

Example 4

There was rapidly added to 1 part of trimethylsilylbutyrylcyclopentadienylmanganesetricarbonyl of Example 1, 15 parts of concentrated sulphuric acid. Methane was rapidly evolved from the mixture and after a period of about 1 hour no further evolution of methane was observed. The mixture was poured onto 300 parts of ice, the resulting mixture was extracted with ether, and the ethereal layer was dried, filtered, and then stripped. The product was fractionated by chromatography following the procedure of Example 1. A yellow oil was obtained. Infrared spectrum of the oil showed the presence of siloxane and the characteristic spectrum of cyclopentadienylmanganesetricarbonyl. Based on method of preparation and its infrared spectrum, the product has the formula,

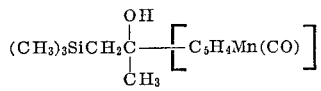

Example 5

A slurry of 0.5 part of lithium aluminum hydride in 21 parts of anhydrous ethyl ether was added to a mixture of 2 parts of gamma-trimethylsilylbutyrylcyclopentadienylmanganesetricarbonyl and 21 parts of anhydrous ethyl ether. An immediate reaction resulted, and the ether was allowed to reflux gently. The reaction was continued for about 1 hour at room temperature. The excess lithium aluminum hydride contained in the mixture was then carefully decomposed with ice water and the resulting mixture was acidified with hydrochloric acid. A yellow ethereal layer was separated from the aqueous phase. It was dried and then stripped. A yellow oil was obtained which was analyzed with infrared. Its infrared spectrum showed carbinol superimposed on cyclopentadienylmanganesetricarbonyl. Based on its infrared spectrum and method of preparation, the product was gamma-trimethylsilyl - n-propyl, cyclopentadienylmanganesetricarbonyl carbinol, having the formula,

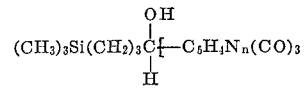

Example 6

There was added with stirring to a solution of 4 parts of p-trimethylsilylbenzoylchloride and 4.2 parts of cyclopentadienylmanganesetricarbonyl dissolved in 100 parts of methylene chloride, 2½ parts of anhydrous aluminum chloride. During the addition, the mixture was stirred under a nitrogen atmosphere. The trimethylsilylbebnzoylchloride was made by the procedure taught by Benkeser, J. Am. Chem. Soc. 76, 599 (1954). The reaction was allowed to proceed at room temperature for about 2 hours. It was then hydrolyzed and the product recovered in accordance with the procedure of Example 1. There was obtained an 80% yield of a yellow solid having a melting point between 113–115° C. Its infrared spectrum showed the presence of carbonyl and a methyl-silicon bond superimposed on the spectrum of cyclopentadienylmanganesetricarbonyl. Based on the method of preparation and its infrared spectrum the product had the formula,

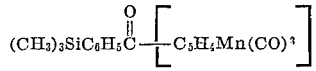

Example 7

There is added to 100 parts of a polydimethylsiloxane polymer having a viscosity of about 7 million centipoises at 25° C., 0.1 part of trimethylsilylbutyrylcyclopentadienylmanganesetricarbonyl while the polymer is being milled. To the resulting mixture there is also added 40 parts of fumed silica followed by 2 parts of benzoyl peroxide. The mixture is then formed into a sheet from which test slabs are cut. Test slabs are also made following the same procedure except trimethylsilylbutyrylcyclopentadienylmanganesetricarbonyl is not added to the milled mixture. The test slabs are then press-cured for 10 minutes at about 150° C. and post-cured for 24 hours at about 315° C. It is found that the compositions containing the compound of Example 1 show superior heat-age resistance as compared to slabs free of the compound of Example 1.

While the foregoing examples have of necessity been limited to only a few of the very many variables within the scope of the present invention, it should be understood that the present invention covers a much broader class of silylorganometalcarbonyls, having radicals shown by Formula 1 bonded to a nucleus as described in the specification preceding these examples. It shoulde also be understood that the present invention is also directed to a method for forming a variety of silylorganometalcarbonyls by the employment of a silyl acid chloride of Formula 4 as well as a variety of other methods that can be utilized to form various silylorganometalcarbonyls and derivatives thereof.

What we claim as new and desire to secure by Letters Patent of the United States is:

1. A silylorganometalcarbonyl having at least one silylorgano radical of the formula,

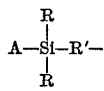

bonded chemically to a nucleus composed of a metalcarbonyl complex of the formula, $$Mn(CO)_3$$

chemically combined with a cyclopentadienyl group, whose free valences, other than those satisfied with said silylorgano radical, are satisfied with monovalent radicals selected from the class consisting of hydrogen radicals, monovalent hydrocarbon radicals, halogenated monovalent hydrocarbon radicals, and mixtures thereof, R is a member selected from the class consisting of hydrogen, halogen radicals, alkoxy radicals, monovalent hydrocarbon radicals, halogenated monovalent hydrocarbon radicals, and cyanoalkyl radicals, A is a member selected from the class consisting of hydroxy, and R, R' is a member selected from the class consisting of an arylene radical, alkylene radical, and —R″—Y—, R″ is a divalent radical having at least two carbon atoms selected from the class consisting of arylene radicals and alkylene radicals and Y is a carbonyl radical.

2. Trimethylsilylpropionylcyclopentadienmanganesetricarbonyl.

3. Trimethylsilylmethylenecyclopentadienemanganesetricarbonyl.

4. 1,1-hydroxymethyl, 2-trimethylsilylethylcyclopentadienylmanganesetricarbonyl.

5. Gamma - trimethylsilyl-n-propyl, cyclopentadienylmanganesetricarbonylcarbinol.

6. p-Trimethylsilylbenzoylcyclopentadienylmanganesetricarbonyl.

7. A method which compries (1) reacting cyclopentadienylmanganesetricarbonyl and a silylorganocarboxylic acid halide having the formula:

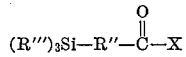

(2) hydrolyzing the resulting reaction product of (1), and (3) recovering the hydrolyzate of (2), where the free valences of the resulting cyclopentadienylmanganesetricarbonyl radical are satisfied by a member selected from the class consisting of hydrogen radicals, monovalent hydrocarbon radicals, halogenated monovalent hydrocarbon radicals and mixtures thereof, X is a halogen radical, R″ is a divalent radical having at least two carbon atoms selected from the class consisting of arylene radicals and alkylene radicals, and R‴ is a member selected from the class consisting of hydrogen, halogen radicals, monovalent hydrocarbon radicals, halogenated monovalent hydrocarbon radicals, and cyanoalkyl radicals.

8. A method in accordance with claim 7, in which the silylorganocarboxylic acid halide and the cyclopentadienylmanganesetricarbonyl, is reacted in the presence of an aluminum halide.

9. A method in accordance with claim 7, in which aluminum chloride is added to a mixture of the cyclopentadienylmanganesetricarbonyl and the silylorganocarboxylic acid halide.

10. A method in accordance with claim 9, in which the metallocene is cyclopentadienylmanganesetricarbonyl.

No references cited.

TOBIAS E. LEVOW, *Primary Examiner.*

J. G. LEVITT, P. F. SHAVER, *Assistant Examiners.*